United States Patent Office 3,134,788
Patented May 26, 1964

---

3,134,788
4,7-DIHYDRO-(2-ACETONYL AND 2-METHYL-2 ACETYL)-1,3-DIOXEPINS
George B. Sterling, Midland, and Chester E. Pawloski, Bay City, Mich., assignors to The Dow Chemical Company, Midland, Mich., a corporation of Delaware
No Drawing. Filed Mar. 5, 1962, Ser. No. 177,175
2 Claims. (Cl. 260—338)

The present invention is directed to dioxepins corresponding to the formula:

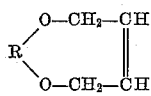

In this and succeeding formulae, R represents 3-oxo-1-butylidene or 3-oxo-2-butylidene. These compounds are liquid materials which are somewhat soluble in many common organic solvents and of low solubility in water. They are useful as parasiticides for the control of a number of insects, worms, nematodes and bacterial and fungal organisms such as trichostrongylids, mites and root-knot nematodes. They are also useful in the manufacture of improved latex polymers and vinyl rubber products such as copolymers with butadiene. The latexes and vinyl rubber products are found to have very desirable and improved tensile, lubricous, soft and elastic properties.

The novel dioxepin compounds are prepared by reacting together 2-butene-1,4-diol and 4,4-dimethoxy-2-butanone or 2,3-butanedione. In a preferred procedure, the reaction between the 2-butene-1,4-diol and 2,3-butanedione is carried out in the presence of a dialkoxyalkane. Suitable dialkoxyalkanes include 2,2-dimethoxybutane, 2,2-dibutoxypropane, 3,3-dimethoxypentane, 2-butoxy-2-methoxypropane, 1,1-diethoxyethane, dimethoxycyclohexane, α,α-dimethoxytoluene and the like. The reaction, in accordance with the present method, is carried out in the presence of a small and catalytic amount of an acidic catalyst such as sulfuric acid, dichloroacetic acid, dichloropropionic acid, phosphoric acid, trichloroacetic acid and the like. Good results are obtained when employing substantially equimolecular proportions of the butenediol and 4,4-dimethoxy-2-butanone or 2,3-butanedione. When employing the dialkoxyalkane, it is used in an amount about equimolecular with the 2,3-butanedione. The reaction conveniently is carried out in an organic liquid as reaction medium and takes place readily at temperatures of from 10° to 100° C. In carrying out the reaction, the butenediol, 4,4-dimethoxy-2-butanone or 2,3-butanedione and dialkoxyalkane reagent, if employed, are mixed together with a catalytic amount of the acid catalyst and the resulting mixture maintained for a short period in the reaction temperature range. Upon completion of the reaction, the reaction mixture is fractionally distilled under reduced pressure to obtain the desired product as a liquid residue.

The following examples merely illustrate the invention and are not to be construed as limiting.

*Example 1.—(4,7-Dihydro-1,3-Dioxepin-2-Yl)-2-Propanone*

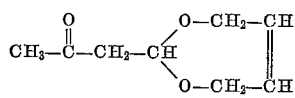

2-butene-1,4-diol (167 grams; 1.9 moles), 250 grams (1.9 moles) of 4,4-dimethoxy-2-butanone and a few drops of sulfuric acid were mixed together with stirring. During the stirring operation, which was carried out at room temperature, a reaction took place resulting in the formation of a single phase. The reaction mixture was thereafter distilled at a 3:1 reflux ratio until the pot temperature reached 130° C. after which it was allowed to cool. A small amount of sodium carbonate was then added to the mixture and the distillation completed under a vacuum to obtain a (4,7-dihydro-1,3-dioxepin-2-yl)-2-propanone product as a liquid material. This product boiled at 82° C. at 1.6 millimeters pressure.

*Example 2.—4,7-Dihydro-2-Methyl-1,3-Dioxepin-2-Yl Methyl Ketone*

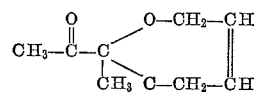

2,3-butanedione (100 grams; 1.15 moles), 102 grams (1.15 moles) of 2-butene-1,4-diol, 121 grams (1.15 moles) of 2,2-dimethoxypropane and a few drops of sulfuric acid were mixed together in 100 milliliters of benzene. The mixing was carried out at room temperature with the formation of a single liquid phase. The reaction mixture was thereafter fractionally distilled at a 3:1 reflux ratio until the pot temperature reached 93° C. after which it was allowed to cool. A small amount of sodium carbonate was then added to the mixture and the distillation completed under reduced pressure to obtain a 4,7-dihydro-2-methyl - 1,3 - dioxepin-2-yl methyl ketone product as a liquid material boiling at 57° C. at 0.9 millimeter pressure, and having a refractive index $n/D$ of 1.4636 at 25° C. and carbon and hydrogen contents of 60.12 and 7.4 percent, respectively, as compared to theoretical contents of 61.6 and 7.7 percent.

The new compounds of the present invention have been found to be useful as parasiticides and as constituents in latexes and vinyl rubber products. For parasiticidal use, the products are dispersed on a finely divided solid and employed as dusts. Also, such mixtures may be dispersed in water with the aid of a wetting agent and the resulting aqueous suspensions employed as sprays. In other procedures, the products are employed as constituents of solvent solutions, oil-in-water or water-in-oil emulsions or water dispersions with or without the addition of wetting, dispersing and emulsifying agents. In representative operations, aqueous compositions containing 5,000 parts per million by weight of 4,7-dihydro-2-methyl-1,3-dioxepin-2-yl methyl ketone compound give 100 percent kills of two spotted spider mites.

What is claimed is:
1. (4,7-dihydro-1,3-dioxepin-2-yl)-2-propanone.
2. 4,7-dihydro-2-methyl-1,3-dioxepin-2-yl methyl ketone.

References Cited in the file of this patent
Chemical Abstracts, "Fifth-Decennial Index," vols. 41–50, Subject Index, page 9R.